United States Patent
Chougule et al.

(10) Patent No.: US 10,293,539 B2
(45) Date of Patent: May 21, 2019

(54) METHOD FOR MANUFACTURING MULTI-BARRIER LAYER BLOW MOLDED CONTAINERS

(71) Applicant: Printpack Illinois, Inc., Elgin, IL (US)

(72) Inventors: Vivek A. Chougule, Bangalore (IN); Rabeh H. Elleithy, Williamsburg, VA (US); David T. Foster, Williamsburg, VA (US); Harold S. Bowen, Hayes, VA (US)

(73) Assignee: Printpack Illinois, Inc., Elgin, IL (US)

( * ) Notice: Subject to any disclaimer, the term of this patent is extended or adjusted under 35 U.S.C. 154(b) by 303 days.

(21) Appl. No.: 14/909,555

(22) PCT Filed: Aug. 7, 2014

(86) PCT No.: PCT/US2014/050202
§ 371 (c)(1),
(2) Date: Feb. 2, 2016

(87) PCT Pub. No.: WO2015/023511
PCT Pub. Date: Feb. 19, 2015

(65) Prior Publication Data
US 2016/0176097 A1    Jun. 23, 2016

Related U.S. Application Data

(60) Provisional application No. 61/864,795, filed on Aug. 12, 2013.

(51) Int. Cl.
*B29C 49/22*    (2006.01)
*B32B 27/08*    (2006.01)
(Continued)

(52) U.S. Cl.
CPC .............. *B29C 49/22* (2013.01); *B29C 49/02* (2013.01); *B29C 49/04* (2013.01); *B29C 53/54* (2013.01);
(Continued)

(58) Field of Classification Search
None
See application file for complete search history.

(56) References Cited

U.S. PATENT DOCUMENTS

| 5,813,197 A | 9/1998 | Aguzzoli |
| 8,124,202 B2 | 2/2012 | Shi et al. |
| 2011/0163483 A1 * | 7/2011 | Harris ................. B29C 47/0023 264/512 |

FOREIGN PATENT DOCUMENTS

| EP | 1955839 A2 | 8/2008 |
| FR | 2851227 A1 | 8/2004 |

(Continued)

OTHER PUBLICATIONS

Search Report and Written Opinion for International Application No. PCT/US2014/050202, dated Jan. 15, 2015 (12 pages).
(Continued)

*Primary Examiner* — Monica A Huson
(74) *Attorney, Agent, or Firm* — Eversheds Sutherland (US) LLP

(57) ABSTRACT

Methods of making containers are provided, including providing a material sheet having at least two barrier layers and at least two polymer layers, forming the material sheet into a tube, sealing the tube at a seal area, and blow molding the tube to form a container in which the at least two barrier layers form a substantially continuous barrier at the seal area.

20 Claims, 7 Drawing Sheets

(51) Int. Cl.
*B29C 49/02* (2006.01)
*B29C 53/54* (2006.01)
*B65D 1/02* (2006.01)
*B29C 49/04* (2006.01)
*B32B 7/12* (2006.01)
*B32B 27/30* (2006.01)
*B32B 27/32* (2006.01)
*B32B 27/36* (2006.01)
*B32B 1/08* (2006.01)
*B32B 1/02* (2006.01)
*B32B 27/34* (2006.01)
*B29K 105/00* (2006.01)
*B29C 65/08* (2006.01)
*B29C 65/00* (2006.01)
*B29C 65/02* (2006.01)
*B29K 23/00* (2006.01)
*B29K 101/12* (2006.01)
*B29L 31/00* (2006.01)

(52) U.S. Cl.
CPC .............. *B32B 1/02* (2013.01); *B32B 1/08* (2013.01); *B32B 7/12* (2013.01); *B32B 27/08* (2013.01); *B32B 27/302* (2013.01); *B32B 27/304* (2013.01); *B32B 27/306* (2013.01); *B32B 27/32* (2013.01); *B32B 27/34* (2013.01); *B32B 27/36* (2013.01); *B65D 1/0215* (2013.01); *B29C 65/02* (2013.01); *B29C 65/08* (2013.01); *B29C 66/1122* (2013.01); *B29C 66/4322* (2013.01); *B29C 66/49* (2013.01); *B29C 66/7234* (2013.01); *B29C 66/8432* (2013.01); *B29C 2049/227* (2013.01); *B29C 2793/0063* (2013.01); *B29C 2793/0081* (2013.01); *B29K 2023/086* (2013.01); *B29K 2101/12* (2013.01); *B29K 2105/258* (2013.01); *B29K 2995/0067* (2013.01); *B29L 2031/712* (2013.01); *B32B 2250/24* (2013.01); *B32B 2250/40* (2013.01); *B32B 2307/7242* (2013.01); *B32B 2307/7248* (2013.01); *B32B 2307/7265* (2013.01); *B32B 2439/00* (2013.01); *B32B 2439/60* (2013.01); *B32B 2439/70* (2013.01)

(56) References Cited

FOREIGN PATENT DOCUMENTS

| | | |
|---|---|---|
| JP | 51028173 A | 3/1976 |
| JP | 58148759 A | 9/1983 |
| JP | 2004175406 A | 6/2004 |
| JP | 200709936 A | 4/2007 |
| WO | 03/066320 A2 | 8/2003 |
| WO | 2007113066 A1 | 10/2007 |
| WO | 2009/144559 A2 | 12/2009 |

OTHER PUBLICATIONS

Second Written Opinion for International Application No. PCT/US2014/050202, dated Jul. 22, 2015 (7 pages).

International Preliminary Report on Patentability for International Application No. PCT/US2014/050202, dated Oct. 28, 2015 (15 pages).

\* cited by examiner

METHOD FOR MANUFACTURING MULTI-BARRIER LAYER BLOW MOLDED CONTAINERS

FIELD

The present disclosure relates generally to container manufacturing, and more specifically to methods for manufacturing multi-barrier layer blow molded containers.

BACKGROUND

Bottles and other containers may be manufactured by various processes, such as thermoforming, rotomolding, blow molding, or extrusion blow molding. Containers may be produced from single or multi-layer materials. A barrier layer may be included in a multi-layer material to extend the shelf life of food or beverage products to be packaged in a container made therefrom. For example, barrier layers may be used where products to be packaged are sensitive to certain gases, or loss of volatiles, flavors, or aromas.

However, a loss of overall barrier performance often occurs where a gap between the barrier layer exists at the weld or seal areas of containers. Accordingly, there is a need for methods for making containers having improved barrier performance at these seal areas.

SUMMARY

In one aspect, methods of making a containers include (i) providing a material sheet having at least two barrier layers and at least two polymer layers, (ii) forming the material sheet into a tube, (iii) sealing the tube at a seal area, and (iv) blow molding the tube to form a container in which the at least two barrier layers form a substantially continuous barrier at the seal area.

In another aspect, methods of making containers include (i) providing a material sheet having at least two ethylene vinyl alcohol barrier layers disposed between at least two polymer layers, (ii) forming the material sheet into a tube, (iii) lap sealing the tube at a seal area, (iv) heating the tube, and (v) blowing the tube against a mold to form a container in which the at least two ethylene vinyl alcohol barrier layers form a substantially continuous barrier at the seal area.

DETAILED DESCRIPTION

The present invention addresses the above-described needs by providing methods for manufacturing containers having improved barrier layer performance. Several embodiments of containers and methods for making containers are described below. Parameters of different steps, components, and features of the embodiments are described separately, but may be combined consistently with this description and claims to enable still other embodiments as will be understood by those skilled in the art.

In certain embodiments, methods of making containers include: (i) providing a material sheet having at least two barrier layers and at least two polymer layers, (ii) forming the material sheet into a tube, (iii) sealing the tube at a seal area, and (iv) blow molding the tube to form a container in which the at least two barrier layers form a substantially continuous barrier at the seal area. As used herein, the term "substantially continuous" refers to the barrier formed by the barrier layers at the seal area being largely unbroken or uninterrupted over the seal area. That is, a barrier is "substantially continuous" if there is no gap between the two barrier layers forming the barrier, or if the gap between the two barrier layers is about 1 nm or less. For example, the Van der Waals radius of an oxygen molecule is 152 pm, so a gap of less than 300 pm will be smaller than the oxygen molecule. A gap of 1 nm or less will provide a substantial barrier to oxygen and other gases.

Containers manufactured via these methods may have a substantially continuous barrier at the seal area, providing improved barrier properties for food and beverage packaging applications.

The Material Sheet

Figure 2:
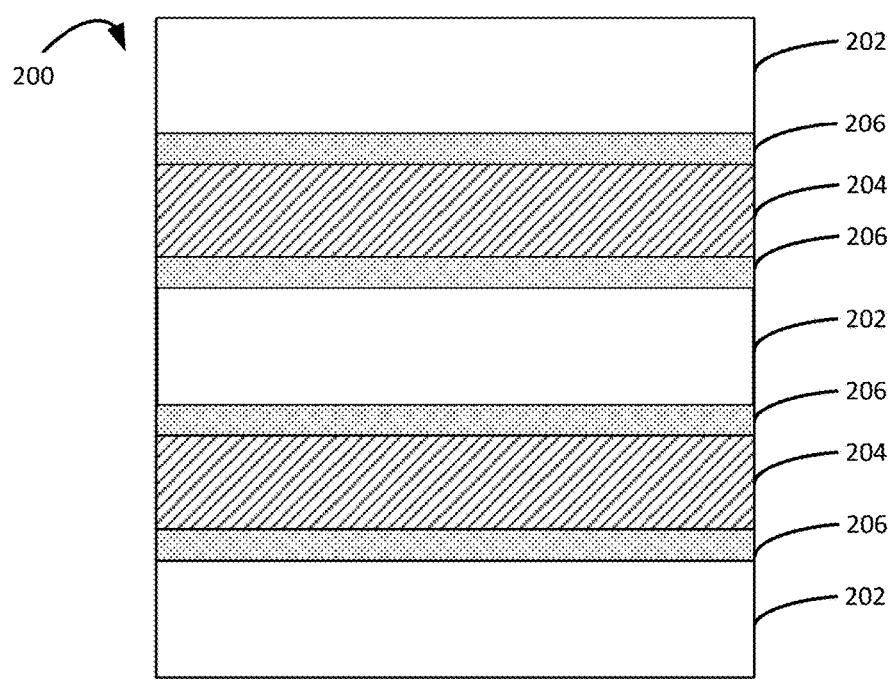
FIG. 2 is a cross-sectional plan view, showing one embodiment of a sheet material.

As shown in FIG. 2, the material sheet 200 includes three polymer layers 202, two barrier layers 204 disposed as inner layers between the two outer polymer layers, and four adhesive layers 206. The adhesive layers may be disposed between a polymer layer and a barrier layer, between two polymer layers, or between two barrier layers. Alternatively, the polymer and/or barrier layers may be disposed adjacent to one another without an adhesive layer therebetween.

In certain embodiments, the material sheet is coextruded or laminated. For example, the material sheet may have a thickness from about 0.2 mm to about 3.0 mm, such as from about 0.2 to about 1.0 mm, from about 1.0 mm to about 3.0 mm, or from about 0.5 mm to about 1.5 mm.

Various configurations of the material sheet are envisioned. For example, two of the at least two polymer layers may be outer layers of the sheet, while the at least two barrier layers may be inner layers disposed between the outer layers. A first adhesive layer may be disposed between a first of the outer layers and a first of the inner layers, and a second adhesive layer may be disposed between a second of the outer layers and a second of the inner layers.

More than two polymer layers and/or more than two barrier layers may be arranged in various configurations in the material sheet. For example, the material sheet may include three, four, five, or more barrier layers disposed between two outer polymer layers, optionally with one or more additional polymer layers contained between the barrier layers. In certain embodiments, the barrier layers are disposed near the outer layers of the material sheet. For example, the barrier layers may be disposed adjacent the outer polymer layers, optionally with an adhesive layer therebetween.

Figure 7:
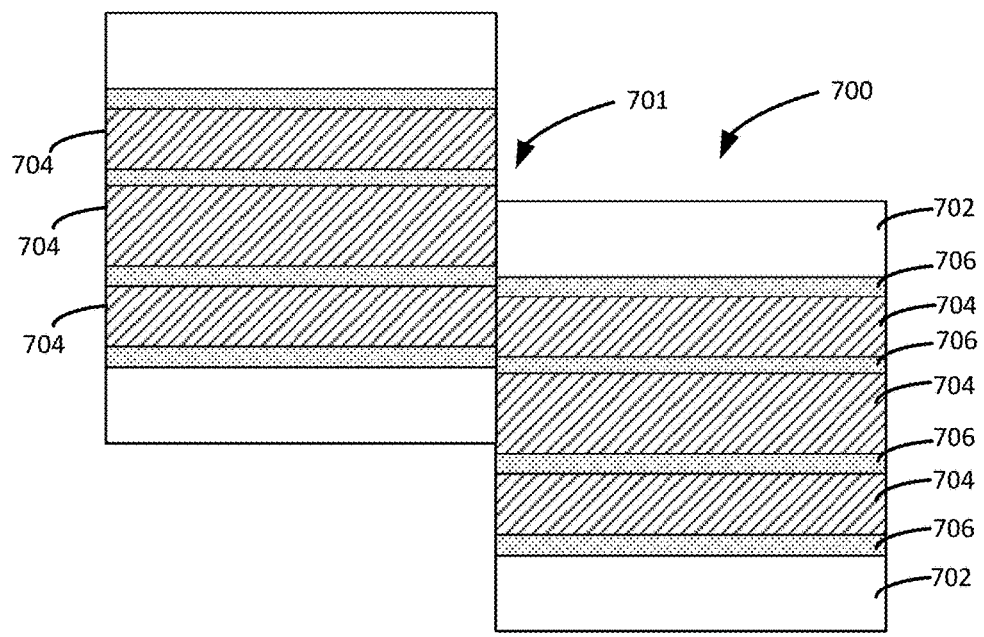
FIG. 7 is a cross-sectional plan view, showing the lap seal area of a multi-barrier layer blow molded container.

In one embodiment, as shown in FIG. 7, the material sheet 700 includes two outer polymer layers 702, three barrier layers 704, and four adhesive layers 706 positioned between the barrier layer/barrier layer interfaces and the barrier layer/polymer layer interfaces.

In certain embodiments, the polymer layers include a thermoplastic polymer. For example, the polymer layers may include polyolefins, such as polypropylene or polyethylene, polystyrenics, such as polystyrene, polyesters, such as polyethylene terephthalate, polylactic acid, post-consumer resins, recycled regrinds, or any combination thereof. Embodiments of the material sheet may include a combination of different polymer layers or substantially similar polymer layers. For example, the polymer layers may have a total thickness from about 1 percent of the overall material sheet thickness to about 95 percent of the overall material sheet thickness, such as from about 10 to about 50 percent of the overall material sheet thickness, from about 25 to about 75 percent of the overall material sheet thickness, or from about 55 to about 95 percent of the overall material sheet thickness. In one embodiment, the thickness of each polymer layer ranges from about 30 to about 60 percent of the overall material sheet thickness.

As used herein, the term "barrier layer" refers to any material layer that may be used as a barrier to restrict the flow of gases through the material sheet. For example, the barrier layer may be effective to restrict loss of volatiles, flavors, or aromas from a container made therewith. In certain embodiments, the barrier layer restricts the flow of oxygen therethrough to protect food or beverage items to be packaged in containers For example, the barrier layers may include ethylene vinyl alcohol, nylon, polyvinylidene chloride, liquid crystalline polymer, or any combination thereof. The barrier layers may also include barrier enhancing additives, such as nano-additives or oxygen scavengers. Embodiments of the material sheet may include a combination of different barrier layers or substantially similar barrier layers. For example, each of the barrier layers may have an oxygen transmission rate from about 0.01 to about 0.1 $cm^3 \cdot mil/100\ m^2/day/atm$, such as from about 0.025 to about 0.05 $cm^3 \cdot mil/100\ m^2/day/atm$, from about 0.01 to about 0.05 $cm^3 \cdot mil/100\ m^2/day/atm$, or from about 0.025 to about 0.075 $cm^3 \cdot mil/100\ m^2/day/atm$.

For example, the barrier layers may have a total barrier thickness from about 1 percent of the overall material sheet thickness to about 50 percent of the overall material sheet thickness, such as from about 10 to about 40 percent of the overall material sheet thickness, from about 25 to about 50 percent of the overall material sheet thickness, or from about 1 to about 30 percent of the overall material sheet thickness.

In certain embodiments, the adhesive layers include polypropylene grafted with a functional group such as maleic anhydride, polyethylene grafted with a functional group such as maleic anhydride, a polystyrene/polypropylene copolymer, such as an interpenetrated copolymer, a polystyrene/polyethylene copolymer, such as an interpenetrated copolymer, or any combination thereof. Similar or different adhesive layers may be used in a single material sheet.

In certain embodiments, the material sheet may include one or more printed layers.

Methods of Making the Containers

Methods of making containers may include: (i) providing a material sheet having at least two barrier layers and at least two polymer layers, as described above, (ii) forming the material sheet into a tube, (iii) sealing the tube at a seal area, and (iv) blow molding the tube to form a container in which the at least two barrier layers form a substantially continuous barrier at the seal area.

Figure 3:
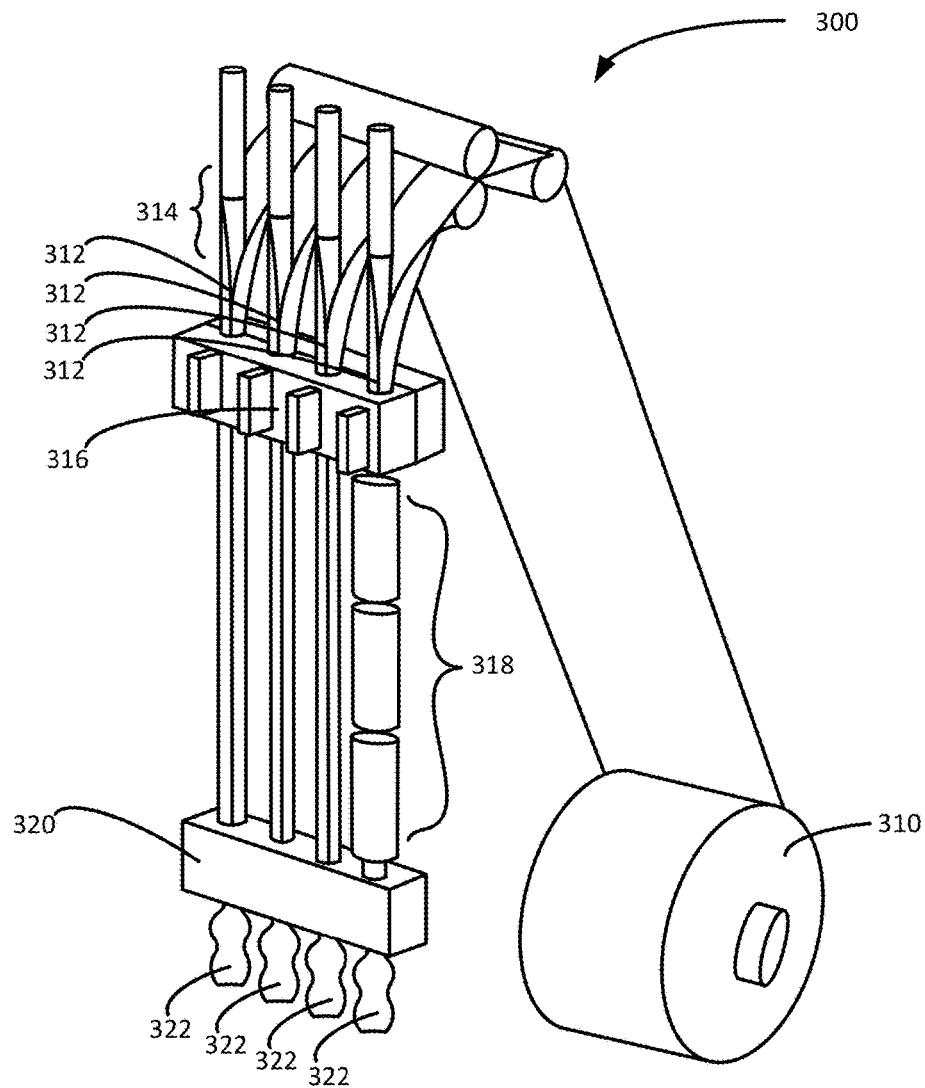
FIG. 3 is a perspective view, showing one embodiment of an apparatus for making blow molded containers.

As shown in FIG. 3, a roll of the material sheet 310 is provided to apparatus 300. The material sheet 310 is formed into one or more tubes 312 at tube forming section 314. For example, the material sheet may be shaped into a tube around a mandrel. The tubes 312 are then sealed at sealing section 316 and blown through mold 320 to form containers 322. Because the material sheet 310 includes at least two barrier layers, the containers 322 formed therefrom will have an improved barrier at the sealed area, for example a substantially continuous barrier that eliminates gas leakage. Containers made from these methods may also display improved barrier properties at the additional seal areas that are created during the blow molding step, for example at any fin weld areas.

In certain embodiments, as shown in FIG. 3, methods of making containers also include slitting the material sheet 310 into more than one strip and forming each of the strips into a tube 312. For example, the material sheet may be slit in the machine direction.

In certain embodiments, the tubes are sealed with a lap seal. The tubes may be sealed using methods known to persons of ordinary skill in the art. For example, the tubes may be sealed using heat welding, ultrasonic welding, or induction welding techniques. For example, the tubes may be sealed lengthwise along the lap seal.

In certain embodiment, the tubes 312 are heated at heating section 318. For example, the step of blow molding the tubes may include heating the tube and blowing the tube against a mold. For example, the tubes may be blown against a chilled mold, and then the formed containers may be separated and released from the mold. These methods may be employed to manufacture containers in a form-fill-seal type operation in which the containers are formed, filled with product, and sealed in a continuous process.

Blow molding advantageously allows for the manufacture of containers having a variety of shapes and sizes. Thus, these methods allow for the manufacture of containers of diverse sizes and shapes having improved barrier properties.

The present invention may be further understood with reference to the following non-limiting examples.

EXAMPLES

Figure 1:
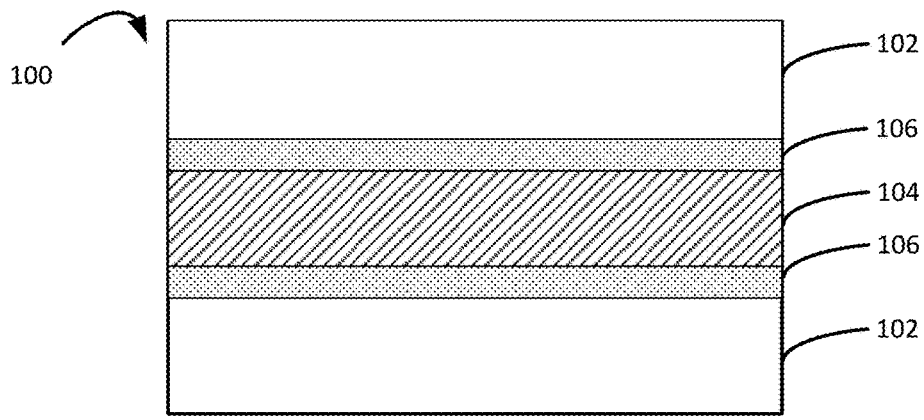
FIG. 1 is a cross-sectional plan view, showing one embodiment of a prior art sheet material.
Figure 4:
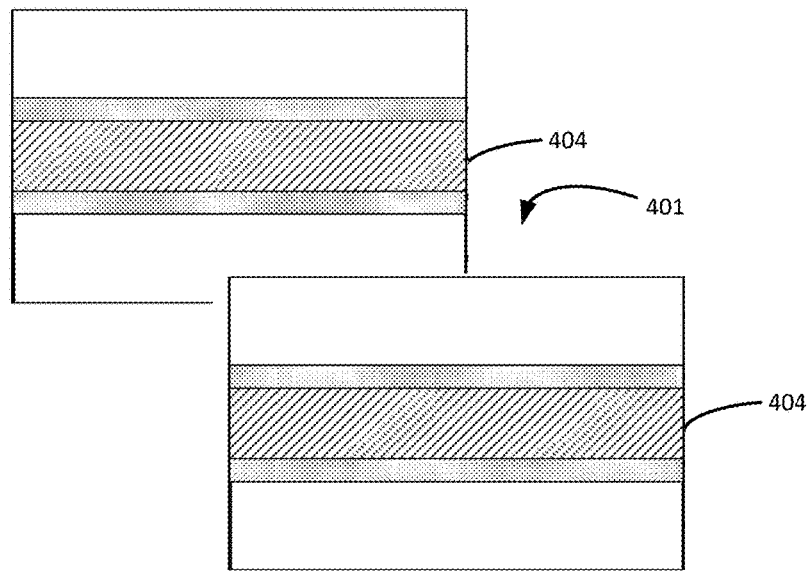
FIG. 4 is a cross-sectional plan view, showing the lap seal area of a single-barrier layer blow molded container.
Figure 5:
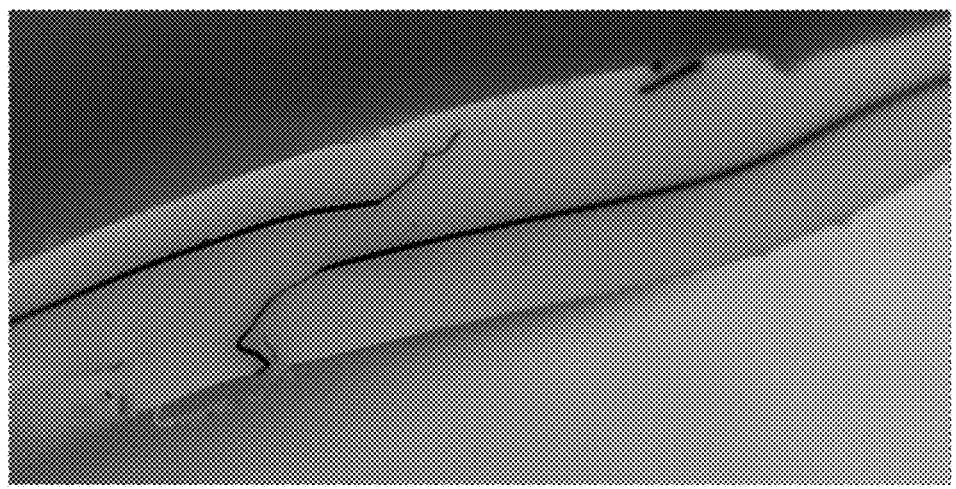
FIG. 5 is a photograph, showing the lap seal area of a single-barrier layer blow molded container.

Comparative samples were made according to the above methods, but using a material sheet having a single barrier layer sandwiched between two polymer layers. For example, FIG. 1 illustrates a material sheet 100, which has a single barrier layer 104 sandwiched between two polymer layers 102 with adhesive layers 106. The single-barrier layer material sheet was rolled into a tube, sealed with a lap seal (as shown in FIG. 4), heated, and blow molded to form a container. A photograph of the cross-section of the lap seal area of one of these samples is shown in FIG. 5. As can be seen in FIG. 5, the barrier of the comparative sample is not continuous at the seal area. Rather, a large polymer layer gap exists between the barrier layers at the overlap. This non-continuous barrier layer causes a loss in overall barrier performance. For example, this loss in performance may allow oxygen to penetrate the container, decreasing the shelf life of food or beverage products packaged in these containers.

Figure 8:
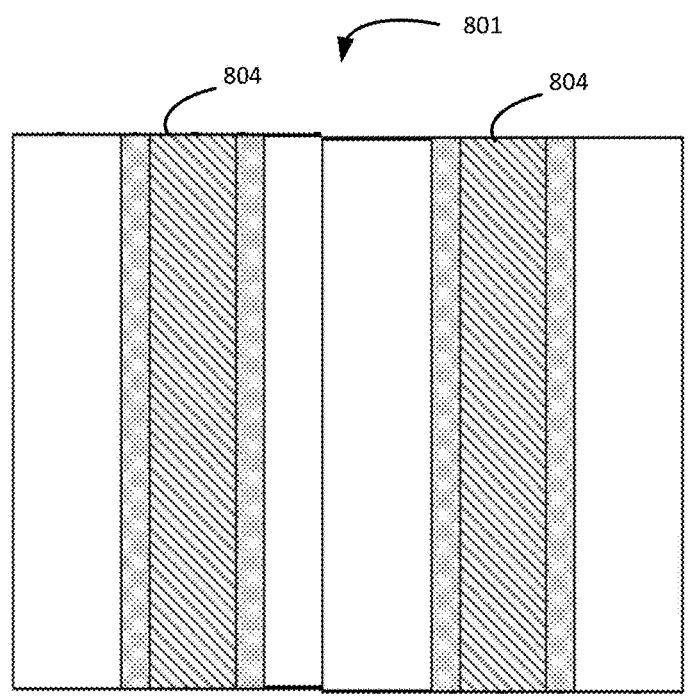
FIG. 8 is a cross-sectional plan view, showing the fin seal area of a single-barrier layer blow molded container.

FIG. 4 illustrates the lap seal area formed from a single-barrier layer material sheet. Again, upon blow molding, a large polymer layer gap exists between the barrier layers 404 at the lap seal area 401 (as shown at FIG. 5). FIG. 8 illustrates a fin seal area 801 formed from a material sheet having a single barrier layer 804.

Samples were made according to the above methods, and using a material sheet having three barrier layers sandwiched between two polymer layers. The multi-barrier layer material was rolled into a tube, sealed with a lap seal, heated, and blow molded to form a container. A schematic of the cross-section of the lap seal area of one of these samples is shown in FIG. 7. As can be seen in FIG. 7, the barrier 704 of the comparative sample is substantially continuous at the seal area. This substantially continuous barrier limits the ability of gases to permeate the container, and limits the ability of volatiles, aromas, and flavors to dissipate. These improved barrier containers provide an extended shelf life for food and beverage products packaged therein.

Figure 6:
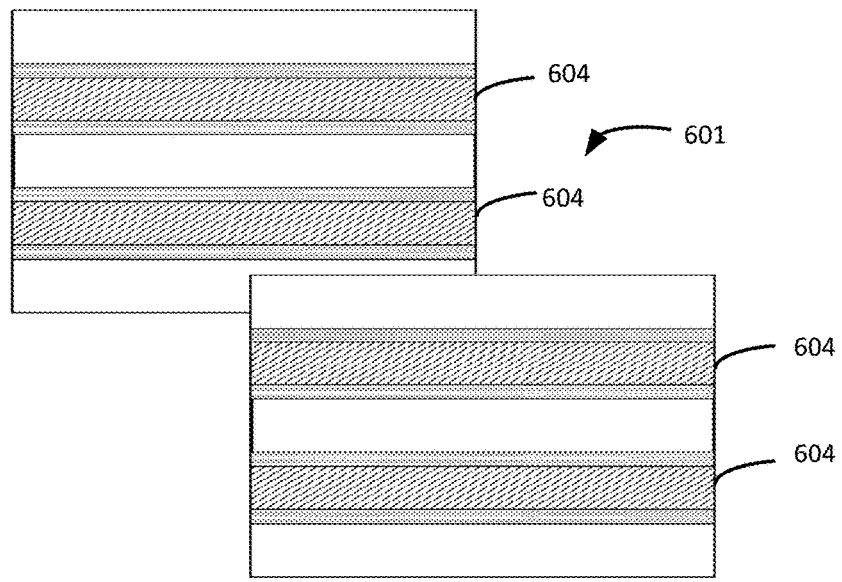
FIG. 6 is a cross-sectional plan view, showing the lap seal area of a multi-barrier layer blow molded container.
Figure 9:
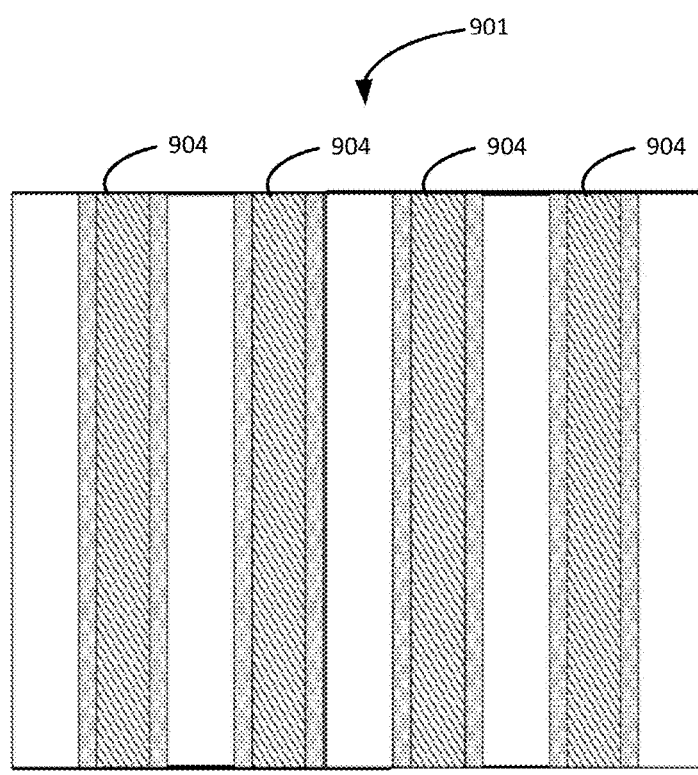
FIG. 9 is a cross-sectional plan view, showing the fin seal area of a multi-barrier layer blow molded container.

FIG. 6 illustrates the lap seal area formed from another embodiment of a multi-barrier layer material sheet. As is shown, once heated in the blow molding process, the barrier layers 604 are positioned to form a substantially continuous barrier at the lap seal area 601. FIG. 9 illustrates a fin seal area 901 formed from a material sheet having multiple barrier layers 904. Like the lap seal areas, fin seal areas formed from a multi-barrier layer material sheet also display an improved barrier at the sealed area, for example a substantially continuous barrier that eliminates gas leakage.

It will be appreciated that various above-disclosed and other features and functions, or alternatives thereof, may be desirably combined into many other different products or applications. Various presently unforeseen or unanticipated alternatives, modifications, variations, or improvements therein may be subsequently made by those skilled in the art which are also intended to be encompassed by the following claims.

We claim:

1. A method of making a container, comprising:
providing a material sheet comprising at least two barrier layers and at least two polymer layers;
forming the material sheet into a tube by lap sealing the material sheet lengthwise at a seal area;
heating the tube such that the at least two barrier layers form a substantially continuous barrier at the seal area; and
blowing the heated tube against a mold, to form a container in which there is either no gap between two of the barrier layers or a gap between two of the barrier layers is 1 nm or less, at the seal area.

2. The method of claim 1, wherein two of the at least two polymer layers are outer layers and the at least two barrier layers are inner layers disposed between the outer layers.

3. The method of claim 2, wherein:
the material sheet further comprises at least two adhesive layers,
a first of the at least two adhesive layers is disposed between a first of the outer layers and a first of the inner layers, and
a second of the at least two adhesive layers is disposed between a second of the outer layers and a second of the inner layers.

4. The method of claim 1, further comprising:
slitting the material sheet into more than one strip prior to forming the material sheet into a tube,
wherein forming the material sheet into a tube comprises forming each of the more than one strips into a tube.

5. The method of claim 4, wherein the material sheet is slit in a machine direction.

6. The method of claim 1, wherein forming the material sheet into a tube comprises shaping the material sheet around a mandrel.

7. The method of claim 1, wherein the at least two polymer layers comprise a thermoplastic polymer.

8. The method of claim 1, wherein the at least two polymer layers comprise polypropylene, polystyrene, polyethylene, polyethylene terephthalate, polylactic acid, or any combination thereof.

9. The method of claim 1, wherein the at least two barrier layers comprise ethylene vinyl alcohol, nylon, polyvinylidene chloride, or any combination thereof.

10. The method of claim 1, wherein the material sheet is coextruded or laminated.

11. The method of claim 2, wherein the material sheet further comprises an inner polymer layer disposed between the inner layers.

12. The method of claim 1, wherein the material sheet has a thickness from about 0.2 mm to about 3.0 mm.

13. The method of claim 1, wherein the at least two barrier layers have a total thickness from about 1 percent of a thickness of the material sheet to about 50 percent of the thickness of the material sheet.

14. The method of claim 1, wherein each of the at least two barrier layers has an oxygen transmission rate from about 0.01 $cm^3 \cdot mil/100 \, m^2/day/atm$ to about 0.1 $cm^3 \cdot mil/100 \, m^2/day/atm$.

15. The method of claim 1, wherein the at least two polymers layers have a total thickness from about from about 1 percent of a thickness of the material sheet to about 95 percent of the thickness of the material sheet.

16. The method of claim 1, wherein the at least two adhesive layers comprise polypropylene grafted with a functional group, polyethylene grafted with a functional group, a polystyrene/polypropylene copolymer, a polystyrene/polyethylene copolymer, or any combination thereof.

17. The method of claim 1, comprising two polymer layers, three barrier layers, and four adhesive layers, wherein the two polymer layers are outer layers.

18. The method of claim 1, wherein the at least two barrier layers comprise ethylene vinyl alcohol.

19. A method of making a container, comprising:
providing a material sheet comprising at least two barrier layers and at least two polymer layers, wherein two of the at least two polymer layers are outer layers and the at least two barrier layers are inner layers disposed between the outer layers;
forming the material sheet into a tube by lap sealing the material sheet lengthwise at a seal area; and
blow molding the tube by heating the tube and blowing the tube against a mold, to form a container in which the at least two barrier layers form a substantially continuous barrier at the seal area, in which there is either no gap between two of the barrier layers or a gap between two of the barrier layers is 1 nm or less.

20. A method of making a container, comprising:
providing a material sheet comprising at least two barrier layers and at least two polymer layers, wherein the at least two polymers layers have a total thickness from about from about 1 percent of a thickness of the material sheet to about 95 percent of the thickness of the material sheet;
forming the material sheet into a tube by lap sealing the material sheet lengthwise at a seal area; and
blow molding the tube by heating the tube and blowing the tube against a mold, to form a container in which the at least two barrier layers form a substantially continuous barrier at the seal area, in which there is either no gap between two of the barrier layers or a gap between two of the barrier layers is 1 nm or less.

* * * * *